United States Patent Office

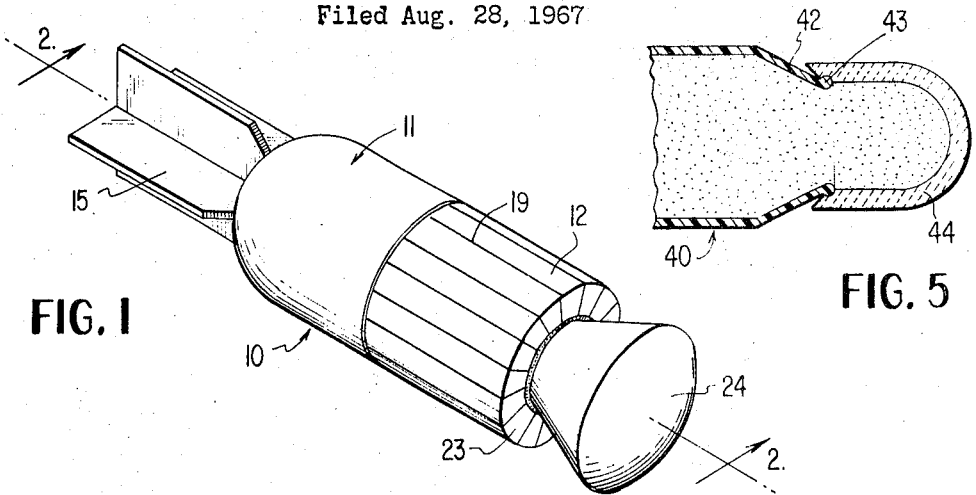
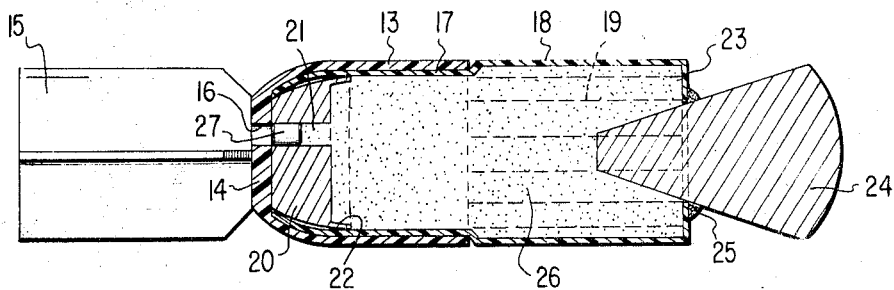
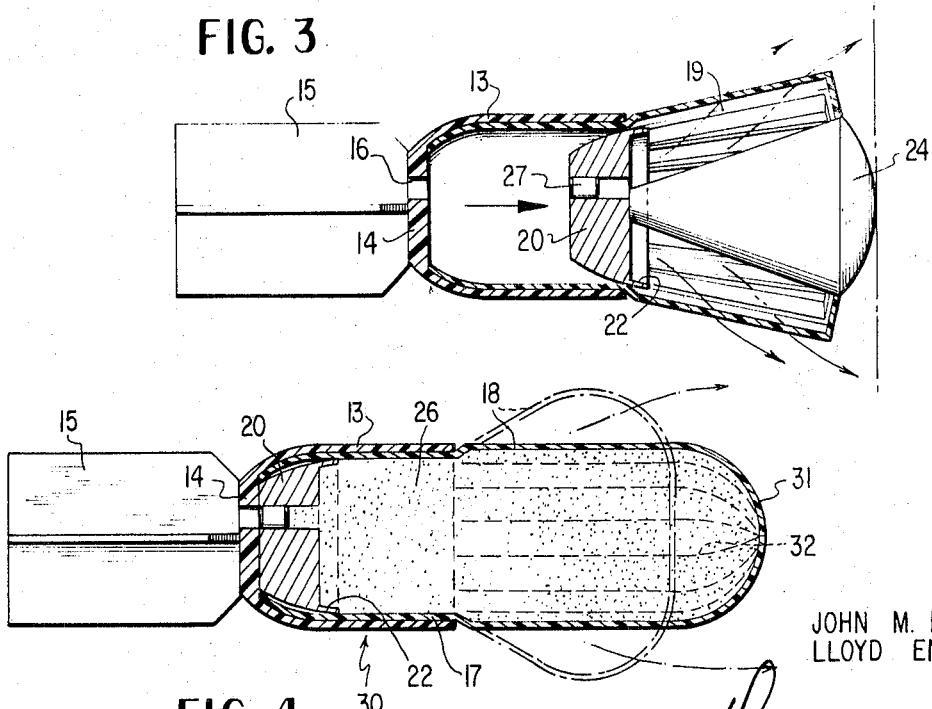
INVENTORS,
JOHN M. MERCHANT
LLOYD ENGLE
BY
ATTORNEYS.

3,528,662
Patented Sept. 15, 1970

3,528,662
MATERIAL DISPENSING PROJECTILE
John M. Merchant, 1st Ave. E. at RR St., Mobridge, S. Dak. 57601, and Lloyd Engle, Orient, S. Dak. 57467
Filed Aug. 28, 1967, Ser. No. 663,885
Int. Cl. A01k *11/00;* A63b *65/02*
U.S. Cl. 273—106.5      4 Claims

ABSTRACT OF THE DISCLOSURE

A projectile for dispensing liquid or powder material on a target upon impact and including a frangible cartridge having a weakened portion adapted to form a dispensing opening upon rupture of the cartridge. A weighted inertia plug behind the contents moves forward at impact in piston fashion facilitating ejection of the contents. The front portion of the cartridge is open. In one embodiment a wedge shaped plug closes the opening so that upon impact the plug wedges the cartridge open. In a second embodiment a frangible cap closes the opening, which cap is broken on impact.

---

This invention relates to new and useful improvements in projectiles. More particularly, the invention relates to a projectile which is adapted to dispense material either in solid or liquid form immediately upon contact with the desired target.

It has always been a problem in the care and breeding of livestock to treat an entire herd or portions of a herd frequently with insecticide either in powder or liquid form in order to control insect infestation as well as various fungus diseases which attack livestock. Conventionally, portions of a herd are rounded up on horseback and are enclosed in a pen where they are sprayed with conventional spraying materials. The effect of sun and rain, however, limit the effectiveness of such spraying methods for application of insecticide and will frequently limit the effectiveness thereof to 16 to 21 days. This, of course, results in the frequent requirement to apply the insecticide to effectively control such blood sucking insects as hornflies. It has been estimated by the United States Department of Agriculture that such flies rob livestock owners of over two hundred million dollars annually in livestock gain.

In addition to the problems of treating livestock and other animals with insecticide, it is frequently necessary on the farm or range to mark one or more animals for various purposes for cutting from the herd for breeding, branding and/or other particular treatment.

The present invention provides a means for facilitating both the marking and/or treating of selected livestock or other animals in a fashion not heretofore recognized in the prior art.

The invention has utility in other fields as well as animal husbandry. With the increase in the crime rate in many of our large cities, especially crimes of violence, a means of self protection which is safe to the victim as well as providing immediate relief from attack and which will hurt, but not crtically wound or kill the assailant is in demand. The present invention provides such a device.

The principal object of the present invention is to provide a projectile which may be hurled or shot from conventional launching means and which is so constructed as to rupture upon contact with the body to automatically dispense upon the animal or person hit, a fluid or solid material.

A further object of this invention is to provide a rupturable cartridge adapted to dispense liquid or solid material which has a positive material ejection means associated therewith actuated by inertia.

A still further object of the present invention is to provide a rupturable projectile adapted to dispense material upon impact incorporating means so that the base portion of the projectile may be reused and wherein the projectile may be filled by the owner with any desired material.

Another object of this invention is to provide a rupturable cartrdige adapted to dispense material upon impact and incorporating a rupturing plug which facilitates expansion of one end of the cartridge and rupture thereof upon impact of the cartridge with the target.

Still another object of this invention is to provide a rupturable cartridge for dispensing either solid or liquid material which is of generally simple construction, has a minimum number of parts, is safe and efficient in use and is inexpensive to manufacture.

The above and other objects and features of the invention will become more apparent from a consideration of the following disclosure.

In order that the general principles of this invention may be readily comprehended, reference should be had to the following detailed description taken in conjunction with the accompanying drawing which illustrates the best mode now contemplated by us for carrying out our invention:

FIG. 1 is a perspective view showing the preferred embodiment of the projectile;

FIG. 2 is a cross-sectional view taken along the lines 2—2 of FIG. 1;

FIG. 3 is a sectional view similar to FIG. 2 but showing the projectile upon impact with a target;

FIG. 4 is a partially sectional view of a first modified form of cartridge; and

FIG. 5 is a partial cross-sectional view of a second modification of the cartridge.

Reference is now made specifically to the drawings, wherein like reference numerals designate similar parts throughout the several views and wherein the projectile assembly constituting the subject matter of this invention is designated generally at 10. The projectile comprises a base portion or casing 11 and a head portion or cartridge 12. Preferably the base portion is molded from a solid piece of fairly rigid plastic material and includes a hollow cylindrical portion 13 and a flat bottom wall portion 14. Integrally formed with the rear face of bottom wall portion 14 are a plurality of vanes 15 which serve to insure stability of the projectile in flight. Although four vanes are shown in the drawings, it will be obvious that any number may be provided depending upon the type of launching device used and the distance the projectile is to traverse. If desired, the vanes may be formed of a thinner dimension than the cylindrical portion 13 and the wall portion 14 may be somewhat thicker than the cylindrical portion 13.

It will be observed from FIG. 2 that a small bore 16 is provided in the flat wall portion 14 for purposes of filling the projectile with the material to be dispensed.

The head or cartridge portion 12 of the projectile consists of a tubular member formed of relatively thin plastic having a narrow diameter portion 17 which is adapted to telescopically fit within and conform to the inside dimension of the cylindrical portion 13. Integral with portion 17 extends tubular portion 18 which is of a slightly larger diameter so that the outer dimension thereof coincides with the diameter of the cylindrical portion 13. The portion 18 is preferably scored or dye cut almost through the material in the manner shown at 19. These cut portions run longitudinally along the outer surface of tubular portion 18 and serve as break lines so that when the cartridge is ruptured upon impact, the cartridge head portion 12 will burst along the lines 19 as shown in FIG. 3. As an alternative, portion 18 may be cut completely through the material and the same subsequently dipped in a sealer such as paraffin wax; the thickness of which may be varied to achieve a desired bursting effect.

A weighted driver plug 20 is telescopically received within the tubular portion 17 and serves to close off the bottom thereof resting against the flat bottom wall portion 14. It will be noted that the driver plug has an opening 21 slightly offset from the axial center thereof which is adapted to be aligned with the bore 16. Preferably the driver plug is formed of metal and has sufficient weight so that upon the projectile striking the target, the plug, which is freely floating, may move forwardly due to its inertia and act as a piston to compress and eject the material in front thereof. To aid in this dispensing action, the front face of the driver plug is provided with an annular-shaped seal 22 which engages the inner side wall of the tubular portion 17.

The front end of the tubular portion 18 in the preferred embodiment is bent inwardly as at 23 to define a front closure having a central circular opening therein within which is received a metal or wooden rupturing plug 24. This plug is of tapered configuration and has a rounded outer end and is held in position within the head portion and is sealed therein by any conventional sealing means 25, such as paraffin or wax.

In use the projectile may either be prefilled at the factory prior to insertion of the rupturing plug 24; the contents being shown at 26, or filled by the user.

As mentioned above, the nature of the contents will vary depending upon the particular application which is contemplated, however, it is obvious that either a powdered particulate material, or liquid material may be carried within the projectile and either may be dispensed with equal facility. By way of example, brightly colored dyes either in liquid or powder form may be employed for selective marking of cattle. Insecticides, in either powder or liquid form may be dispensed. For purposes of self-defense, a tear gas agent or a liquid having a highly disagreeable odor may be used so that the person struck with the projectile may be readily marked and easily identified within a short time thereafter.

When the projectiles is to be filled by the user it will be preassembled with the rupturing plug 24 sealed in place and the contents may be inserted through the aligned openings 16 and 21 which may then be sealed by a filling plug 27. The plug may be formed of cork or soft rubber so that liquid contents may be inserted therein by injection wherein a conventional hypodermic needle may be passed through the plug to discharge the fluid contents into the central area.

The means by which the projectile or cartridge may be launched is limitless and it is contemplated that a gas pistol, a cross bow or conventional bow and arrow or a sling shot may be used and if the device is made in large sizes, the projectile may even be thrown by hand. It is contemplated that farm youths will derive great satisfaction and pleasure and target practice in the firing of these projectiles at livestock and it is further contemplated that the devices themselves may be used solely for target practice emitting a marking dye directly on the target.

FIG. 3 shows the action of the driver plug 20 and the rupturing plug 24 in conjunction with tubular portion 17 when the projectile has struck the target. It will be noted that the wedging action of the rupturing plug serves to expand the tubular portion 17 which will break along the score lines 19 providing longitudinal openings or passageways through which the liquid or solid material may be dispensed. In conjunction therewith, the weighted driver plug 20 will, due to inertia, move forward exerting additional pressure upon the contents and due to the tight fit of the annular seal 22, completely clean out the interior of the projectile, moving the material upwardly and forwardly.

While the head or cartridge portion 12 of the projectile will be destroyed in use, it is contemplated that the base portion, the driver plug, and even the rupturing plug may be reused many times.

While thin plastic is shown as the preferred material for the head portion, it is also understood that paper, cardboard or clay may be used as well.

In FIG. 4 we have shown a modified form of projectile identified generally at 30 which employs the same base portion 11 including the cylindrical portion 13, vanes 15, and driver plug 20 as noted in the preferred embodiment. In this modification a different form of cartridge is employed obviating the necessity for the rupturing plug 24. In the modified form of FIG. 4, the cartridge has tubular portions 17 and 18 identical to that shown in the preferred embodiment, however, the tubular portion 18 is closed and forms a spherical end 31. In this species the score lines 32 run longitudinally and continue until they meet at the central axial point on the spherical end.

In use the modified form of FIG. 4 will mushroom into the position shown in the dotted lines upon impact with the target, thereby breaking through the score lines and allowing the contents to be emitted as described in reference to the preferred embodiment.

Yet another embodiment of the invention is shown in FIG. 5 wherein a third form of cartridge is shown. Here the cartridge wall generally shown at 40 terminates in a tapered or wedge formation 42. An annular bead 43 is formed adjacent the end of the cartridge. In this modification the end of the cartridge is closed by a cap 44 shown formed of clay, however, any suitable equivalent material may be employed. The inner wall of cap 44 is formed with an annular groove to receive the bead 43. This cartridge construction is reuseable as only the head end cap 44 will be destroyed in use; the cartridge being adapted to be refilled and fitted with a new cap.

It will be apparent that in use the end cap of the modification of FIG. 5 will be forced rearwardly where the tapered or wedge portion of the cartridge will aid in rupturing the cap to allow the contents to be dispensed.

While we have shown and described a preferred embodiment of the invention, it is to be understood that the drawing and detailed disclosure are to be construed in an illustrative rather than a limiting sense since various modifications and substitutions of equivalents may be made by those skilled in the art within the spirit and scope of this invention as defined in the appended claims.

What we claim as our invention and desire to protect by Letters Patent of the United States is:

1. A material dispensing projectile comprising
   (a) a tubular casing formed of relatively thick material,
   (b) a plurality of stabilizing vanes extending from the rear of said casing,
   (c) a tubular cartridge being open at its forward end and having its rearward end open and telescopically received within said casing, said cartridge formed from material thinner than said casing,
   (d) a weighted inertia driver plug mounted within said cartridge and closing off the open end thereof, said plug being free for axial movement,
   (e) an annular outwardly directed seal on the forward face of said plug making wiping contact with the inner walls of said cartridge, and
   (f) a frangible replaceable cap closing the forward end of said cartridge, and means to secure said cap on said cartridge.

2. A material dispensing projectile comprising,
   (a) a tubular casing,
   (b) a frangible cartridge, a portion of which is received within said casing, said cartridge being adapted to hold the material to be dispensed,
   (c) a weighted driver plug mounted at the rear end of said cartridge and freely movable therein to aid in discharge of the material due to its inertia after the cartridge has broken open, and (d) a tapered rupturing plug extending from the forward end of said cartridge with its narrow end within the cartridge, said plug upon impact with a target moving rearwardly wedging apart the cartridge wall and facilitating rupture thereof.

3. A material dispensing projectile as defined in claim 2, wherein each of said driver plug and the rear face of said casing have small filler openings, and means to close the opening in said driver plug.

4. A material dispensing projectile as defined in claim 2 and further including an annular outwardly directed seal on the forward face of said driver plug making wiping contact with the inner walls of said cartridge.

References Cited

UNITED STATES PATENTS

| | | |
|---|---|---|
| 3,207,157 | 9/1965 | Murdoch. |
| 3,209,696 | 10/1965 | Palmer et al. ......... 102—92 |
| 3,266,806 | 8/1966 | Warren et al. |

FOREIGN PATENTS

| | | |
|---|---|---|
| 407,899 | 1934 | Great Britain. |

ANTON O. OECHSLE, Primary Examiner

P. E. SHAPIRO, Assistant Examiner

U.S. Cl. X.R.

102—66, 92.7